United States Patent
Dinka et al.

(10) Patent No.: US 11,496,427 B2
(45) Date of Patent: Nov. 8, 2022

(54) MEDIA APPLIANCE

(71) Applicant: Rovi Technologies Corporation, San Jose, CA (US)

(72) Inventors: David Dinka, Stockholm (SE); Gisela Gier, London (GB)

(73) Assignee: Rovi Technologies Corporation, San Jose, CA (US)

( * ) Notice: Subject to any disclaimer, the term of this patent is extended or adjusted under 35 U.S.C. 154(b) by 0 days.

(21) Appl. No.: 16/570,188

(22) Filed: Sep. 13, 2019

(65) Prior Publication Data

US 2020/0084167 A1    Mar. 12, 2020

Related U.S. Application Data

(63) Continuation of application No. 14/677,569, filed on Apr. 2, 2015, now Pat. No. 10,454,862, which is a (Continued)

(30) Foreign Application Priority Data

Mar. 31, 2010    (GB) ..................... 1005458

(51) Int. Cl.
    *H04L 51/10*        (2022.01)
    *H04L 65/1089*      (2022.01)
    (Continued)

(52) U.S. Cl.
    CPC .......... *H04L 51/10* (2013.01); *H04L 65/1089* (2013.01); *H04L 67/10* (2013.01);
    (Continued)

(58) Field of Classification Search
    CPC ......... A63F 2300/572; A63F 2300/577; H04L 51/10; H04L 65/1089; H04L 67/10;
    (Continued)

(56) References Cited

U.S. PATENT DOCUMENTS

| | | | |
|---|---|---|---|
| 9,266,017 B1* | 2/2016 | Parker | A63F 13/355 |
| 2004/0127284 A1* | 7/2004 | Walker | G07F 17/3227 463/30 |

(Continued)

FOREIGN PATENT DOCUMENTS

WO    WO-2008015369 A1 *    2/2008    ......... H04L 65/1066

OTHER PUBLICATIONS

Call of Duty: Modern Warfare 2 Review https://www.ign.com/articles/2009/11/10/call-of-duty-modern-warfare-2-review Written by Mark Bozon Nov. 10, 2009 (Year: 2009).*

(Continued)

*Primary Examiner* — Dmitry Suhol
*Assistant Examiner* — Jeffrey K Wong
(74) *Attorney, Agent, or Firm* — Haley Guiliano LLP

(57) ABSTRACT

A media appliance comprising: video apparatus for outputting signals to a screen; a control device allowing a user to control the output of signals from the video apparatus to the screen, thereby selecting a viewing activity; a network interface for accessing a packet-based network; a memory storing a communication client application; and processing apparatus, coupled to the memory, network interface and video apparatus, and arranged to execute the communication client application; wherein the client application is configured so as when executed to allow the user to conduct bidirectional communications with other users via the packet-based network, and output notifications to the user of incoming communication events received from other users over the packet-based network; and wherein the client application is further configured to defer one or more of said notifications of incoming communication events received during said viewing activity, determine a delineation in the viewing activity, and automatically output the one or more notifications to the user following said delineation.

20 Claims, 7 Drawing Sheets

Related U.S. Application Data continuation of application No. 12/843,293, filed on Jul. 26, 2010, now Pat. No. 8,998,720.

(51) Int. Cl.

| | | |
|---|---|---|
| *H04N 21/422* | (2011.01) | |
| *H04N 21/443* | (2011.01) | |
| *H04N 21/454* | (2011.01) | |
| *H04N 21/478* | (2011.01) | |
| *H04N 21/4788* | (2011.01) | |
| *H04N 21/485* | (2011.01) | |
| *H04N 21/488* | (2011.01) | |
| *H04N 21/61* | (2011.01) | |
| *H04N 21/84* | (2011.01) | |
| *H04N 21/47* | (2011.01) | |
| *H04N 21/431* | (2011.01) | |
| *H04L 67/10* | (2022.01) | |
| *H04M 7/00* | (2006.01) | |
| *H04M 7/12* | (2006.01) | |

(52) U.S. Cl.
CPC ... *H04N 21/4221* (2013.01); *H04N 21/42221* (2013.01); *H04N 21/42222* (2013.01); *H04N 21/4316* (2013.01); *H04N 21/4431* (2013.01); *H04N 21/4542* (2013.01); *H04N 21/47* (2013.01); *H04N 21/4781* (2013.01); *H04N 21/4788* (2013.01); *H04N 21/485* (2013.01); *H04N 21/4882* (2013.01); *H04N 21/6125* (2013.01); *H04N 21/6175* (2013.01); *H04N 21/84* (2013.01); *A63F 2300/572* (2013.01); *A63F 2300/577* (2013.01); *H04M 7/006* (2013.01); *H04M 7/122* (2013.01)

(58) Field of Classification Search
CPC ........ H04N 21/4221; H04N 21/42221; H04N 21/42222; H04N 21/4316; H04N 21/4431; H04N 21/4542; H04N 21/47; H04N 21/4781; H04N 21/4788; H04N 21/485; H04N 21/4882; H04N 21/6125; H04N 21/6175; H04N 21/84; H04M 7/006; H04M 7/112

See application file for complete search history.

(56) References Cited

U.S. PATENT DOCUMENTS

| | | | | |
|---|---|---|---|---|
| 2005/0041793 | A1* | 2/2005 | Fulton | H04M 3/436 379/211.01 |
| 2005/0075885 | A1* | 4/2005 | Danieli | A63F 13/537 704/276 |
| 2007/0265091 | A1* | 11/2007 | Aguilar, Jr. | A63F 13/12 463/42 |
| 2009/0192970 | A1* | 7/2009 | O'Sullivan | H04L 51/04 706/48 |
| 2012/0315880 | A1* | 12/2012 | Peitrow | H04M 1/642 455/412.1 |

OTHER PUBLICATIONS

Youtube video of Call Of Duty Modern Warfare 2 Multiplayer Online Chopper Gunner https://www.youtube.com/watch?v=f0SfBzfiSa0 Uploaded by TheSandyRavage Nov. 6, 2009 (Year: 2009).*

* cited by examiner

MEDIA APPLIANCE

CROSS-REFERENCE TO RELATED APPLICATIONS

This application is a continuation of U.S. patent application Ser. No. 14/677,569, filed Apr. 2, 2015, now U.S. Pat. No. 10,454,862, which is a continuation of U.S. patent application Ser. No. 12/843,293, filed Jul. 26, 2010, now U.S. Pat. No. 8,998,720, which claims priority to Great Britain Application No. 1005458.3, filed Mar. 31, 2010, all of which are hereby incorporated by reference in their entireties.

FIELD OF THE INVENTION

The present invention relates to a media appliance such as a television set or set-top box having an embedded processing apparatus for conducting voice or video calls via a packet-based network.

BACKGROUND

Some communication systems allow the user of a terminal, such as a personal computer, to conduct voice or video calls over a packet-based computer network such as the Internet. Such communication systems include voice or video over internet protocol (VoIP) systems. These systems are beneficial to the user as they are often of significantly lower cost than conventional fixed line or mobile networks. This may particularly be the case for long-distance communication. To use a VoIP system, the user installs and executes client software on their terminal. The client software sets up the VoIP connections as well as providing other functions such as registration and authentication. In addition to voice communication, the client may also set up connections for other communication media such as Instant messaging ("IM"), SMS messaging, file transfer and voicemail.

One type of communication system for packet-based communication uses a peer-to-peer ("P2P") topology. To enable access to a peer-to-peer system, a user executes P2P client software supplied by a P2P software provider on their terminal, and registers with the P2P system. When the user registers with the P2P system, the client software is provided with a digital certificate from a server. This may be referred to as a "user identity certificate" (UIC). Once the client software has been provided with the certificate, then calls or other communication connections can subsequently be set up and routed between end-users ("peers") of the P2P system without the further use of a server in the call set-up. Instead, the client looks up the required IP addresses from information distributed amongst the P2P client software on other end-users' terminals within the P2P system. That is, the address look-up list is distributed amongst the peers themselves. Once the IP address of a callee's terminal has thus been determined, the caller's P2P client software then exchanges UIC certificates with the callee's P2P client software. The exchange of these digital certificates between users provides proof of the users' identities and that they are suitably authorised and authenticated in the P2P system. Therefore the presentation of digital certificates provides trust in the identity of the users.

It is therefore a characteristic of peer-to-peer communication that, once registered, the users can set up their own communication routes through the P2P system in at least a partially decentralized manner based on distributed address look-up and/or the exchange of one or more digital certificates, without using a server for those purposes. Further details of an example P2P system are disclosed in WO 2005/008524 and WO 2005/009019.

VoIP or other packet-based communications can also be implemented using non-P2P systems that do use centralized call set-up and/or authorisation, e.g. via server.

A problem with packet-based communications is that their accessibility to users is limited. In particular, such communications are most commonly accessed using a personal computer. This has the disadvantage that the user must be sufficiently technically competent to download, install and operate the packet-based communication client software on their personal computer, which provides a barrier to the take-up. Even when the communication client is installed and executed on a personal computer, its use may be limited because personal computers are often not located in a place where the user is either familiar or comfortable with communicating. For example, a personal computer is often located in a study which for many users is not the most natural or comfortable environment for making phone calls.

Whilst packet-based communication systems can also be accessed via certain mobile devices, these generally do not have processing resources or display screens available to offer a full range of features, such as video calling.

It would therefore be desirable to make packet-based communications more accessible to users. One way to do this would be to run a packet-based communication client on a processor embedded in a familiar household media appliance like a television set or set-top box for plugging into a television. Embedded in this context means within the casing of the appliance. The ability to integrate an embedded processor into a television set or set-top box is known, and indeed many modern televisions and boxes already contain a processor for performing at least some of the digital signal processing required to decode and output viewable television signals to the screen.

SUMMARY

However, the inventors have recognised that one or more potential problems may still exist due to a conflict between the added functionality of the client application and the existing functionality of a conventional television.

Particularly, operation of the client is likely to interfere with the user's viewing, because incoming calls will be asynchronous with the current state of the television. That is to say, the calls are not chosen to be initiated by the user of the television, but instead arrive over the packet-based network at unpredictable times at the initiation of another, remote user, and therefore may arrive when the television is occupied with other viewing activities such as viewing television programmes or viewing content from other sources like an external DVD player, games console, etc.

According to one aspect of the present invention, there is provided a media appliance comprising: video apparatus for outputting signals to a screen; a control device allowing a user to control the output of signals from the video apparatus to the screen, thereby selecting a viewing activity; a network interface for accessing a packet-based network; a memory storing a communication client application; and processing apparatus, coupled to the memory, network interface and video apparatus, and arranged to execute the communication client application; wherein the client application is configured so as when executed to allow the user to conduct bidirectional communications with other users via the packet-based network, and output notifications to the user of incoming communication events received from other users over the packet-based network; and wherein the client application is further configured to defer one or more of said notifications of incoming communication events received during said viewing activity, determine a delineation in the viewing activity, and automatically output the one or more notifications to the user following said delineation.

Thus the present invention automatically defers notifications of incoming calls or other communications until after the user's viewing activity has finished or has otherwise reached a suitable juncture, prompting the user with the notifications once that time has been reached. This means a user will not be unduly disturbed by asynchronous incoming communication events during the viewing activity in question, but instead will be prompted about those communication events later at a more suitable time.

In one preferred application of the present invention, the media appliance may comprise a television receiver for receiving television signals representing television programmes via a television network; the video apparatus may be coupled to the television receiver, and operable to output the television signals of selected television programmes from the television receiver to the screen; the control device may allow a user to control the output of television signals to the screen, thereby selecting a television programme as said viewing activity; and the client application may be configured to defer one or more notifications of incoming communication events received during the selected television programme, determine a delineation in the selected television programme, and automatically output the one or more notifications to the user following said delineation.

The television receiver may be arranged to receive the television signals via a broadcasting network.

The media appliance may be one of: a television set comprising said screen, and a set-top box for plugging into a television set.

The incoming communication event may comprise an incoming packet-based voice or video call.

In preferred embodiments, the client application may be configured to determine said delineation based on information received by the television receiver via said television network, relating to the selected television programme.

Many modern television signals are transmitted in association with additional programme data (In addition to the audio and video of the programme itself). E.g. in digital television broadcasts, data on programme timing may be multiplexed along with the audio and video data into a transport stream. This timing information may comprise real-time indications of when programmes actually start, finish and potentially when they contain commercial breaks; and/or may comprise nominal schedule information such as an electronic program guide (EPG). In embodiments of the present invention, this information can advantageously be used to determine the time until which notifications should be postponed.

So for example, said information may comprise programme schedule information relating to the selected programme. The client application may comprise an API for accessing the EPG received by the television receiver via said network, and may be configured to determine said delineation based on scheduling information from the EPG relating to the selected programme.

In another example, the client application may be configured to determine said delineation by detecting a real-time indication received by the television receiver via said network relating to the selected television programme, and output the one or more notifications to the user upon detecting said indication. Said indication may indicate one of: the end of the selected television programme, and a break in the selected television programme.

The latter example is particularly preferred, since it allows the actual real-time end of the program or real-time breaks, rather than using a nominal schedule. However, the former case may also provide a reasonable approximation in absence of a real-time signal.

Another possibility is that the client application may be configured to determine said delineation based on information received over the packet-based network via the network interface relating to the selected television programme.

The client application may be configured to detect said delineation based on a timer set by the user.

The client application may be configured to detect said delineation based on a user input indicating the delineation.

The notification may take the form of either audible and/or on-screen notifications. In the case of on-screen notifications, it is particularly preferable that they should be deferred until after the programme or other viewing activity in question.

Therefore in further embodiments the client application may be configured to output the one or more deferred notifications for display on the screen.

Furthermore, the client application may be configured to output the one or more deferred notifications for display on the screen along with an on-screen control allowing the user to initiate a return communication with a corresponding other user via the packet-based network.

This advantageously facilitates more efficient return of the call or other communication.

In further embodiments the client application may be configured to return, prior to said delineation, an automated message to the one or more other users of the one or more incoming communication events received during the viewing activity.

The client application may be configured to use the programme schedule information to supply expected information regarding said delineation, and therefore the user's expected availability, in said automated message.

Thus it is possible not only to defer a notification until after the programme or other viewing activity in question, but also to inform the other, remote user about the lack of availability. Particularly desirable is to use the programme schedule information to predict for the benefit of the remote user when the called user will be available again (e.g. when his or her television programme will be finished).

In a further embodiment the communication client may comprise a user-setting arranged to toggle between a first mode of operation in which notifications of incoming communication events received during the viewing activity are deferred, and a second mode of operation in which such notifications are not deferred and are instead output to the user during the viewing activity.

In further applications of the present invention, the video apparatus may comprise a gaming system operable to output graphics signals of a video game to the screen; the control device may allow a user to control the output of graphics signals to the screen, and to thereby select the video game as said viewing activity; and the client application may be configured to defer one or more of said notifications of incoming communication events received during the video game, determine a delineation in the video game, and automatically output the one or more notifications to the user following said delineation.

The client application may be configured to detect said delineation when a player dies or loses within the video game.

The video apparatus may comprise an input from an external source of video signals, operable to output the video signals to the screen; the control device may allow a user to control the output of video signals to the screen, and to thereby select the external source for said viewing activity; and the client application may be configured to determine said delineation based on a status of the external source.

According to a further aspect of the present invention, there is provided a method of operating a media appliance having video apparatus for outputting signals to a screen, a network interface for accessing a packet-based network, and a processing apparatus for executing a communication client application; the method comprising: receiving an input from a control device allowing a user to control the output of signals from the video apparatus to the screen, thereby selecting a viewing activity; and executing a communication client application on the processing apparatus of the media appliance, so as when executed to allow the user to conduct bidirectional communications with other users via the packet-based network, and so as to output notifications to the user of incoming communication events received from other users over the packet-based network; wherein the execution of the communication client application further comprises deferring one or more of said notifications of incoming communication events received during said viewing activity, determining a delineation in the viewing activity, and automatically outputting the one or more notifications to the user following said delineation.

In embodiments the client application may be further configured in accordance with any of the above features of the media appliance.

According to another aspect of the present invention, there is provided a communication client application for operating a media appliance having video apparatus for outputting signals to a screen and a network interface for accessing a packet-based network, the communication client application comprising code embodied on a computer-readable medium and configured so as when executed on an embedded processor of the media appliance to: receive an input from a control device allowing a user to control the output of signals from the video apparatus to the screen, thereby selecting a viewing activity; enable the user to conduct bidirectional communications with other users via the packet-based network; output notifications to the user of incoming communication events received from other users over the packet-based network; wherein the client application is further configured to defer one or more of said notifications of incoming communication events received during said viewing activity, determine a delineation in the viewing activity, and automatically output the one or more notifications to the user following said delineation.

In embodiments the method may further comprise in accordance with any of the above features of the media appliance.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

Figure 1:
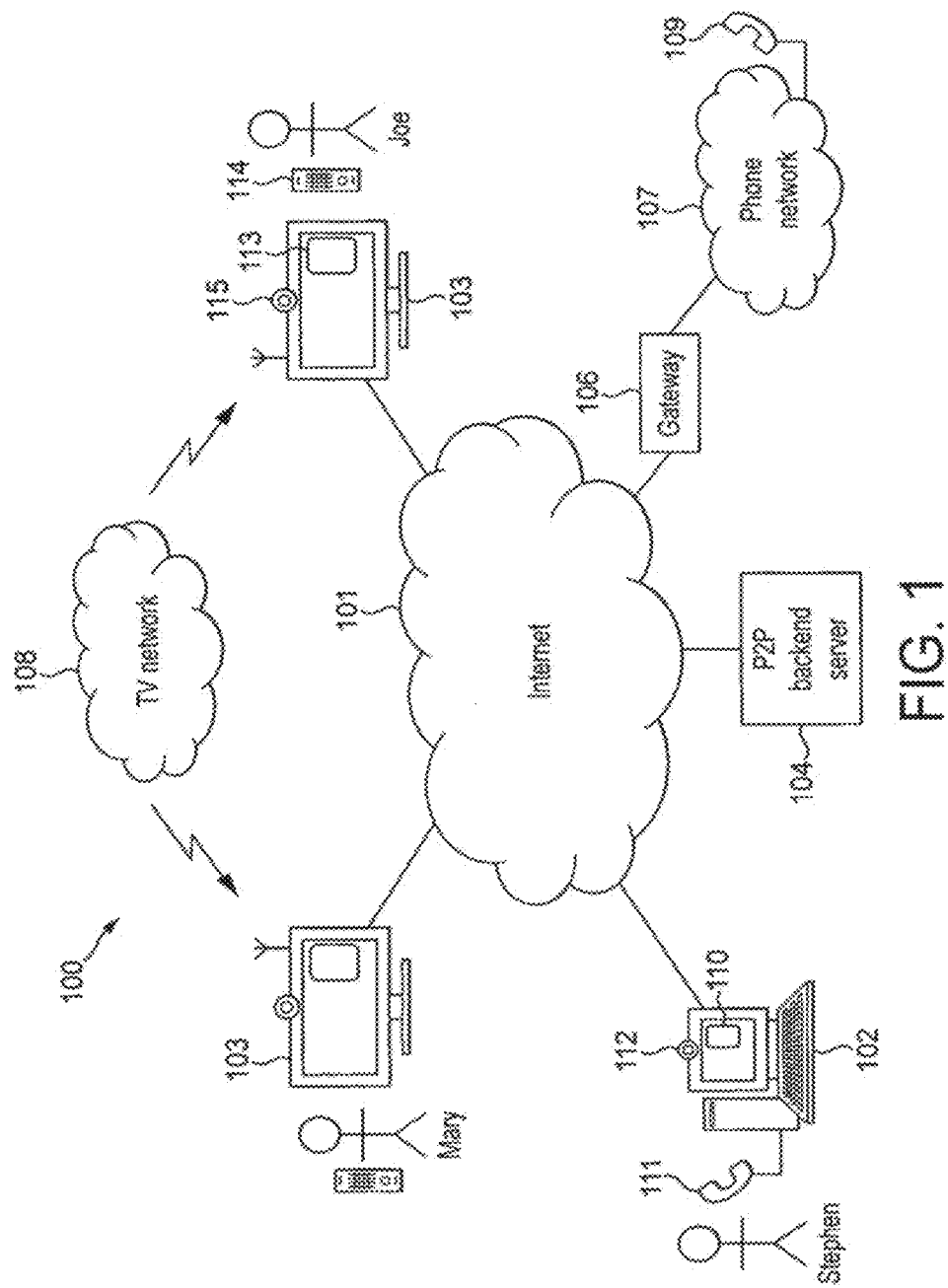
FIG. 1 is a schematic representation of a communication system.

FIG. 1 shows a communication system 100 comprising a packet-based network 101 such as the Internet; and further comprising a separate television broadcasting network 108 such as a terrestrial, satellite or cable television network. A plurality of computer terminals 102 are shown coupled to the Internet 101, each comprising a network interface for communicating over the Internet. A plurality of television sets 103 are also shown coupled to the Internet 101, each of which also comprises a network interface for communicating over the Internet. In addition to the network interface, each television set 103 further comprises a television receiver for receiving analogue and/or digital television signals which are broadcast over the television network 108. Alternatively or additionally, a television set 103 could be arranged to receive packet-based television signals over the Internet 101 or other such packet-based network. However, broadcast television is still popular at the time of writing and so in preferred embodiments the television set 103 will comprise a television receiver for receiving broadcasts at least.

The difference between a broadcast and a communication made over a packet-based network is that broadcast signals are transmitted indiscriminately, without transmitting to selected destination devices and regardless of whether the end-user has selected to receive the signal (although a decryption key or such like may still be required so that only authorised users can derive meaningful information from the television signal for viewing). Packet-based communications on the other hand are point-to-point, with an address of the intended destination device being included in the packets. In the case of packet-based television signals transmitted over the Internet, these are still point-to-multipoint communications rather than a broadcast.

Each computer terminal 102 is installed with a communication client application 110. Each computer terminal 102 also comprises an audio transceiver 111 comprising a speaker and microphone, e.g. In the form of a headset or handset, or a built-in speaker and microphone. Most computer terminals 102 preferably also comprise a webcam 112. Furthermore, each television set 103 comprises an embedded processor and memory installed with a version of the communication client application 113 specially adapted for running on a television set. Each television set 103 also comprises a webcam 115 and an audio transceiver with speaker and microphone, or is connected or communicable with such components. In a particularly preferred embodiment an audio transceiver is provided in a remote control unit 114 of the television 103, discussed shortly.

The communication client applications 110 and 113 are preferably peer-to-peer clients for setting-up and conducting VoIP calls according to peer-to-peer principles as discussed above. To that end, a peer-to-peer backend server 104 is coupled to the Internet 101 for receiving registration requests from the client applications 111 and 113. The back-end server 104 is arranged to distribute UIC certificates to the respective client applications 111 and 113 running on the computer terminals 102 and television sets 103 in response to the registration requests. Once registered and thus in possession of a UIC certificate, the client applications 111 and/or 113 can look-up one another's addresses, exchange and authenticate one another's certificates, and thus establish a voice or video call over the Internet 101. It will be appreciated however that other kinds of communication client could alternatively be used, e.g. based on centralized server-based call set-up.

In addition, the communication system 100 may comprise a telephone network 107 such as a circuit-switched network, and a gateway 106 connecting between the Internet 101 and the telephone network 107. A gateway version of the client application is arranged to run on the gateway 106, and a communication client application 110 or 113 running on a computer terminal 102 or television set 103 thus able to establish a call with a dedicated phone unit 109 of the telephone network 107. This is achieved by establishing a connection with the client on the gateway 106 using peer-to-peer call set-up and then supplying the relevant telephone number to the gateway 107 (effectively the user's client 110 or 113 sees the gateway 106 as a peer). The phone network 107 may for example comprise a fixed-line network ("landline") and/or a mobile cellular network.

Figure 2:
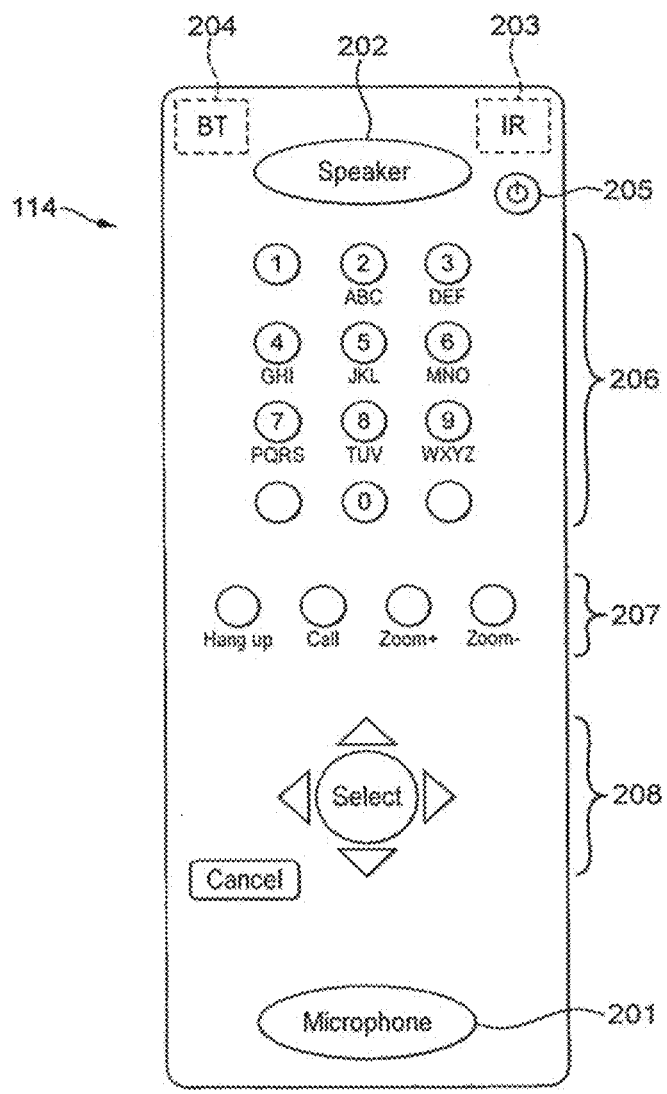
FIG. 2 is a schematic representation of a remote control unit.

Each television set 103 has an associated remote control unit 114, an example of which is illustrated in FIG. 2.

As shown in FIG. 2, the remote control unit (or just "remote control") comprises a microphone 201, speaker 202, a first remote interface in the form of an infrared (IR) transmitter 203, and a second remote interface in the form of a short-range RF interface 204 such as a Bluetooth interface. The microphone 201 and speaker 202 are operatively coupled to the Bluetooth interface 204. The remote control 114 is thus arranged to communicate voice signals from the microphone 201 to the television 103 via the Bluetooth interface 204, and to receive voice signals from the television 103 via the Bluetooth interface 204 for playing out of the speaker 202.

The remote control 114 further comprises a plurality of buttons operatively coupled to the infrared transmitter 203, arranged so as to allow the user to control the television 103 via the infrared transmitter 203. The buttons comprise a "standby" button 205 for setting the television into a low-power mode. The buttons further comprise numerical or alphanumeric buttons 206 for changing channel or supplying other numerical or alphanumerical data to the television 103; function buttons 208 for controlling various functions of the television 103, e.g. for controlling a cursor and/or menu system; and optionally dedicated calling buttons 207 for performing specific dedicated operations relating to the calling functionality of the client application 113, e.g. "call", "hang up", or buttons for zooming in and out during a video call.

Figure 3A:
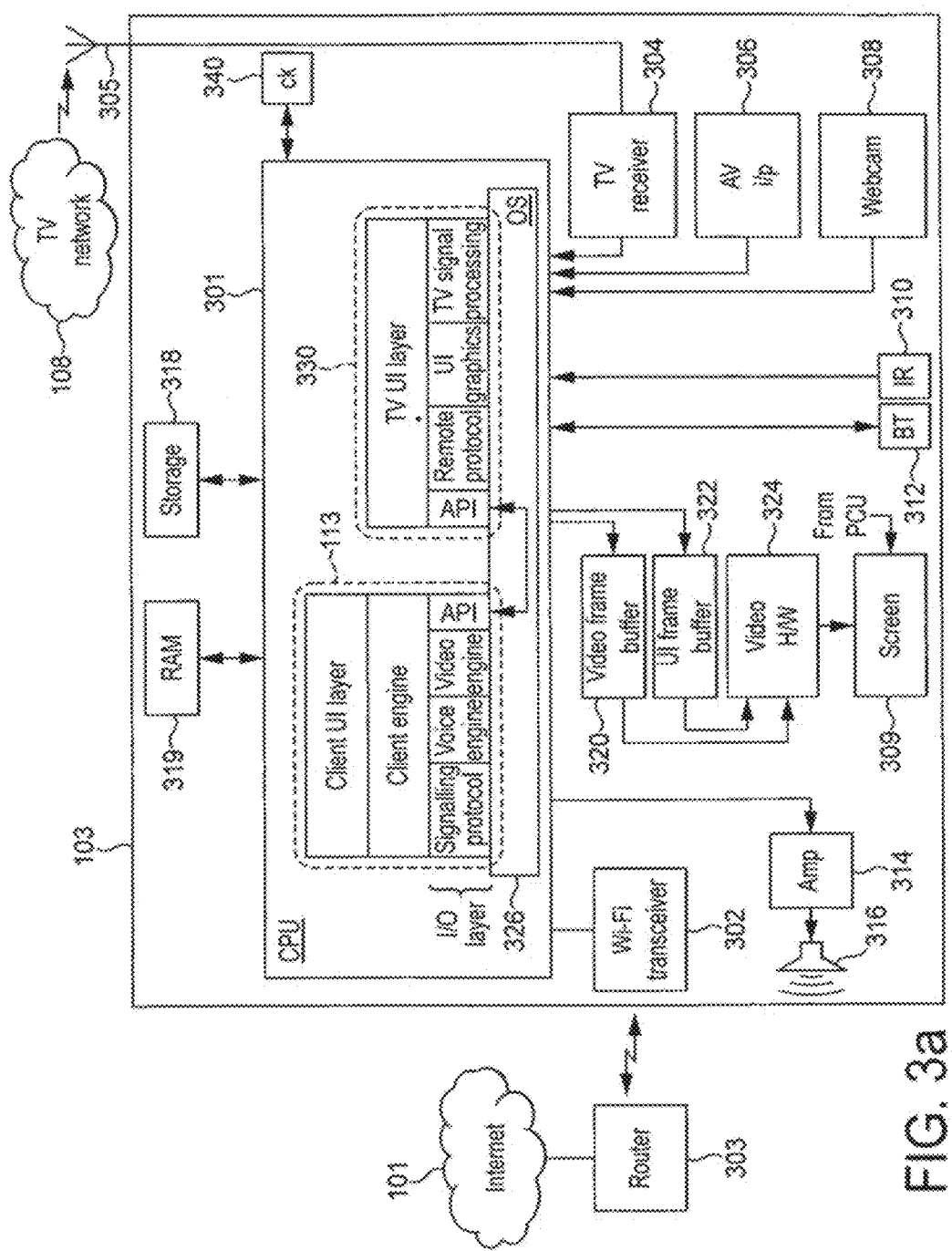
FIG. 3a is a schematic block diagram of a television set.

FIG. 3a is a schematic block diagram of a television set 103 according to an exemplary embodiment of the present invention. The television set 103 is a dedicated television unit in the sense that its primary purpose is as a television, and is designed to fulfil the role of a family or household television. However, at the same time it is additionally provided with secondary embedded functionality such as VoIP calling.

The televisions set 103 comprises, within a single casing: an embedded processing apparatus 301; a random access memory (RAM) 319; and an embedded non-volatile storage device 318 which may comprise an electronically erasable and reprogrammable memory (EEPROM or "flash" memory), a magnetic storage medium, and/or a one-time writable ROM. The non-volatile storage device 318 is coupled to the processing apparatus 301 and stores a basic operating system (OS) 326, a television application 330, and a communication client application 113 such as a VoIP client. The processing apparatus 301 is arranged to execute the operating system 326, e.g. either by fetching instructions directly from ROM or by first loading from a flash memory into the RAM 319 before fetching. When executed, the operating system 326 is configured to load the television application 330 and client application 113 into RAM 319 and schedule them for execution on the processing apparatus 301. The processing apparatus 301 is thus arranged to run the television application 330 and client application 113 under control of the operating system 326. In embodiments only a minimal operating system 326 may be required, in the form of a basic scheduler.

The television set 103 further comprises, within the same casing: a video frame buffer 320 and user interface (UI) frame buffer 322, video hardware 324, a screen 309, an amplifier 314 and speaker 316 or output to an external speaker or headphones, a television receiver 304, an external audio-video (AV) input 306 such as a SCART or HDMI input from an external source, a webcam or webcam input 308 for connecting to an external webcam, a network interface 302 in the form of a first short-range RF transceiver such as a wi-fi transceiver, a first remote interface 310 in the form of an infrared (IR) receiver, and a second remote interface in the form of a second short-range RF transceiver 312 such as a Bluetooth transceiver.

The video frame buffer 320 and user interface (UI) frame buffer 322 each have an input coupled to the processing apparatus 301. The video hardware 324 has an input coupled to the outputs of the video frame buffer 320 and UI frame buffer 322. The screen 309 has an input to the output of the video hardware 324. In embodiments, the frame buffers 320 and 322 could be dedicated hardware buffers or alternatively could be implemented in a general purpose memory. The amplifier 314 has an input coupled to the processing apparatus 301 and an output coupled to the speaker 316. The processing apparatus 301 is further coupled to the network interface 302, television receiver 304, auxiliary input 306, webcam input 308, infrared interface 310, and Bluetooth interface 312.

Any or all of the above components may be coupled to the processing apparatus 301 via intermediate components such as a bus and/or cache (not shown), as will be understood by a person skilled in the art.

The television receiver 304 comprises an input for connecting to at least one reception means such as an antenna, satellite dish or cable line, and is thus arranged to receive television broadcast signals from the television network 108 via the reception means. The television receiver 304 is a hardware front-end which may comprise for example: sampling circuitry, a low noise amplifier, a filter, a mixer, and/or an analogue-to-digital converter (ADC). Once received by the television receiver unit 304, the television signals are thus made available to the processing apparatus 301 for signal processing. The television application 330 comprises a signal processing engine in the form of code which, when executed, performs at least some of the required signal processing on the received television signals. The processed television signals are then output to the video frame buffer 320 and amplifier 314 for consumption by the end user. The signal processing engine may comprise for example: a digital filter, demodulator, demultiplexer, decoder, decryption block, and/or error checking block. However, different ways of allocating the television receiver and processing functionality between software and dedicated hardware are also possible. E.g. in embodiments, more of the functionality such as the demultiplexing could be moved to the receiver front-end 304. Techniques for receiving and processing television signals will be known to a person skilled in the art.

In the case of traditional analogue television broadcasts, the signals of a plurality of different concurrent programs (of different TV channels) are frequency-division multiplexed over the airwaves by being transmitted on different frequencies. The television receiver 304 will then comprise a tuning circuit to demultiplex the broadcasts and thereby separate out the signal of the required programme. In the case of digital television broadcasts, the signals of different concurrent programs are each divided into packets and interleaved so as to time-division multiplex the different programs' signals into a transport stream for broadcast. The signal processing engine of the television application 330 will then comprise a packet filter to demultiplex the packets of different transport streams and so separate out the signal of the required programme. Multiple transport streams may also be broadcast on different frequencies, requiring a tuner as well. Furthermore, for digital television, one or more of the transport streams may comprise additional programme information such as an electronic programme guide (EPG).

Video signals for output to the television screen 309 may also be received via the AV input 306 from an external source such as a DVD player or games console.

The television application 330 further comprises a UI graphics engine, a remote protocol engine, an application programming interface (API), and a television UI layer. The overall operation of the signal processing engine, UI graphics engine, remote protocol engine and API is controlled by the television UI layer. The user can select which broadcast to view by pressing buttons 205, 206, 208 on the remote control 114, causing the remote control 114 to communicate control signals to the processing apparatus 301 via the infrared transmitter 203 and receiver 310. The user may also use the buttons in a similar manner to view additional information such as the EPG or control menus, and to navigate the EPG or menus. The relevant control signals are interpreted by the remote protocol engine of the television application 113, which in turn communicates with the television UI layer. In response, the television UI layer controls the signal processing engine to output the relevant television programme to the video frame buffer 320, and/or controls the UI graphics engine to output graphics to the UI frame buffer 322 (e.g. to display the graphics of the menu or EPG). The frame buffers 320 and/or 322 supply their contents to the video hardware 324 for display on the screen 309. In embodiments the UI frame buffer 322 and video hardware 324 may be arranged to overlay UI graphics over the current television programme in a partially transparent manner, and/or to leave at least part of the television programme visible.

As mentioned, the television set 103 comprises a network interface 302. In preferred embodiments this takes the form of a wireless transceiver such as a wi-fi transceiver, for communicating wirelessly with a household or office-based wireless router 303 as found in most modern homes or offices. The router 303 in turn connects to the Internet 101. However, in alternative embodiments the network interface 302 may comprise other options such as a wired modem or a port to an external wired modem.

The communication client application 330 comprises a protocol stack having an I/O layer which, when executed on the processing apparatus 301, is operable to transmit and receive signals over the Internet 101 via the network interface 302. The I/O layer comprises a network signalling protocol for transmitting and receiving control signals over the Internet 101 via the network interface 302. The I/O layer may also comprise an API for communicating with the API of the television application 301.

The I/O layer further comprises a voice engine comprising a voice codec. The voice engine is arranged to accept speech signals from the microphone 201, and to encode those speech signals for transmission over the internet 101 via the network interface 302. The voice engine is also arranged to decode speech signals received over the Internet 101 via the network interface 302, for output to the television's amplifier 314 and speaker 316, or to the speaker 202 in the remote control 114 via the Bluetooth interfaces 312 and 204. The I/O layer further comprises a video engine comprising a video codec. The video engine is arranged to accept video signals from the webcam input 308, and to encode those video signals for transmission over the Internet 101 via the network interface 302. The video engine is also arranged to decode video signals received over the Internet 101 via the network interface 302, for output to the UI frame buffer 322, video hardware 326 and screen 309. Alternatively, in a full-screen mode the video codec could output video via the video frame buffer 320.

Higher up the protocol stack, the client application 113 comprises a client engine which is responsible for call-set up. The client engine controls the network signalling protocol engine of the client 113 in order to establish a live voice or video call with another user terminal 102 or 103 over the Internet 101, preferably using P2P call set-up as discussed above, or potentially using a centralized call set-up via a server. The client engine may also handle other functions such as connection management, authentication, encryption, and/or exchanging presence information with the client applications 111 or 113 of other user terminals (presence information indicates the availability of a user for communication, and is preferably at least partially defined by the respective user themselves).

Even higher up the protocol stack, the client application 113 comprises a client UI layer which is responsible for the client's user interface. The client UI layer is operable to generate a client user interface for output to the UI frame buffer 322, video hardware 324 and screen 309. This may be output via the APIs and the UI graphics engine of the TV application 330 under control of the TV UI layer (or alternatively the client application 113 could be provided with its own UI graphics protocol to output graphics to the UI frame buffer 322 directly). The client user interface thus presents the user with on-screen controls which they can activate using buttons 206, 207, 208 on the remote control 114. Based on these button presses, the remote control 114 communicates control signals to the processing apparatus 301 via the infrared transmitter 203 and receiver 310. These control signals may be interpreted by the UI protocol engine in the television application 330 and then signalled via the APIs to the I/O layer of the client application 113 (or alternatively the I/O layer of the client application 113 could be provided with its own remote control protocol to interpret these control signals directly). In turn, the protocol of the I/O layer of the client 113 communicates with the client UI layer. The client UI layer is thus configured to respond to user inputs in order to control the overall operation of the client application 113, e.g. allowing a user to select contacts to call, hang up, etc.

Figure 4:
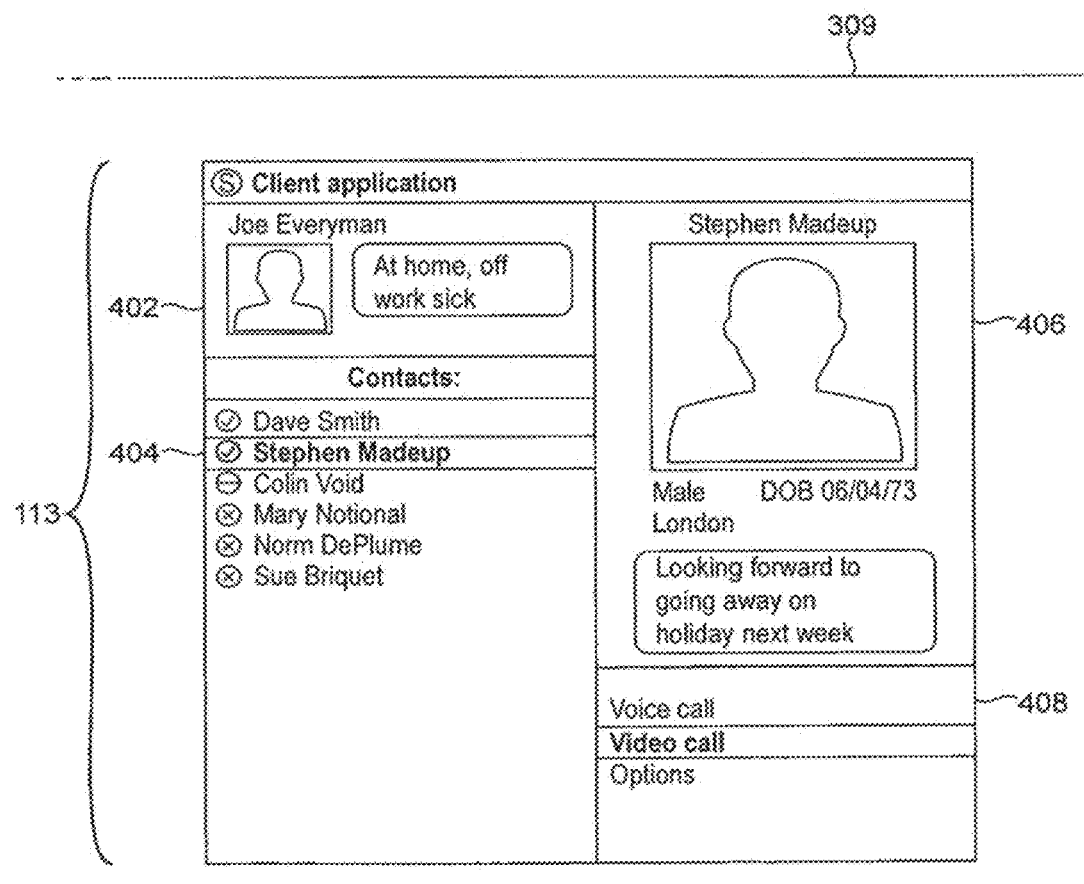
FIG. 4 is a schematic representation of a user interface.

FIG. 4 illustrates an example user interface which could be displayed on the screen 309 by the client application 113, when summoned by the user using the relevant buttons of the remote 114. The user interface may be displayed only on part of the screen 309, allowing at least a portion of a currently viewed programme to remain visible; or may alternatively take up the whole screen 309. The displayed user interface comprises a number of panels. For example, the user interface may comprise a first panel 402 showing profile information of the user of the television 103 on which the client 113 is running. E.g. the profile information may comprise the user's name, an "avatar image" (a picture which the user has chosen to represent themselves), and/or a "mood message" (a short user-defined statement for inclusion in their profile). Further, the user interface may comprise a second panel 404 showing a list of the user's contacts (preferably the client 113 is configured to only allow calls between users who have agreed to be contacts). Further, the user interface may comprise a third panel 406 showing a profile of a selected one of the contacts, and/or a fourth panel 408 providing a menu or other controls for selecting to call the selected contact.

Furthermore, the UI layer of the client 113 may be configured to communicate with the UI layer of the television application 330, via the APIs and the operating system 326. This allows the client application 113 and television application 330 to negotiate control of the screen 309 and/or speaker 316 or 202.

Whether the client application 113 or television application 330 takes precedence may depend on the implementation and/or situation. Since the television set 103 is primarily a television, then preferably the client application 113 should require permission from the television application 330 before controlling the screen 309 or speaker 316 or 202. However, in embodiments a user-defined setting may be provided allowing the user to control whether or not the client application 113 can autonomously take control of the screen 309 and/or speaker 316 or 202, e.g. to notify the user in event of an incoming call. This setting would preferably be stored in a non-volatile memory 318 and be readable by the client application 113 and/or television application 330. E.g. the television application 330 may be configured to read a setting from memory and, if set, to unequivocally allow the client application 113 to control the screen and/or speaker. Alternatively the client application 113 may be configured to read a setting from memory and, if set, to control the screen and/or speaker without seeking permission from the television application 330.

In a preferred embodiment of the present invention, at least one such user setting is read by the client application 113, and when set the client application 113 is configured to defer any notifications of incoming VoIP calls or other incoming communication events received over the Internet 101 until a suitable juncture in the user's television viewing. This could mean deferring a notification until after a television programme is finished, or until some other suitable juncture in the programme such as a commercial break. Another possibility would be to defer a notification until after video signals cease to be received via the AV input 306 from an external source such as DVD player or games console. Generally speaking, incoming communication events signalled asynchronously to the television set 103 over the Internet 101 via the network interface 302 are postponed in deference to a higher-priority source such as the television receiver 308 and television network 108, or AV input 306 and external source.

Note that the concept of deferring a notification is distinct and advantageous over the mere outright suppression of a notification. Suppressing the notification would mean barring it altogether so as never to be output to the user; whereas deferral requires that the notification will still output to the user, but postponed until some later point in time.

In order to do this, the client application 113 is configured with a mechanism for delineating the viewing activity in question. The client application 113 will not understand the actual user content of the television programme or such like, so cannot directly tell when one programme ends and another begins, or cannot directly tell the difference between the main programme and the commercial breaks. Therefore a delineation mechanism is required, for which there are a number of options as discussed below.

A first, preferred mechanism involves receiving additional programme information broadcast over the television network 108. In this case the additional programme information is received by the client application 113 via the television receiver 308, and comprises timing information which can be used by the client application 113 to delineate the television programme for the purpose of deferring notifications.

Figure 6:
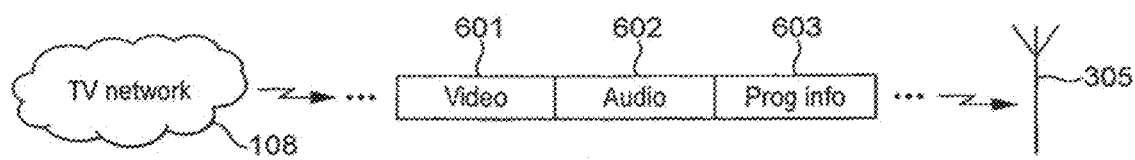

As illustrated schematically in FIG. 6, a digital television broadcast may comprise audio data 601 and video data 602 of one or more programme streams all interleaved together (i.e. time-division multiplexed) into a combined transport stream for transmission on a particular frequency. Also interleaved into the transport stream is additional program information 603 providing timing information for the one or more programmes (potentially amongst other information such as subtitles and textual programme summaries or précis). The additional programme information 603 may take the form of a general data stream multiplexed into the transport stream in conjunction with a plurality of programme streams, providing programme information for a plurality of programmes. An example of this would be an electronic program guide (EPG). Alternatively or additionally, individual respective programme information may be provided in the stream of each programme. The audio data, video data and additional programme information are decoded by the signal processing engine of the television application 331, and the required programme timing information can be accessed by the client application 113 via the APIs under control of the TV UI layer.

In one variant of this first mechanism, the programme timing information 603 comprises programme schedule information such as the EPG. That is, nominal information about when the programme or programmes are scheduled to start and end. For example, the API of the client application 113 may enable it to access the EPG decoded by the signal processing engine of the television application 331. The client 113 can thereby determine that the television programme currently being viewed on the screen 309 is scheduled to end at a particular time, and defer the notification until that time.

Figure 5A:
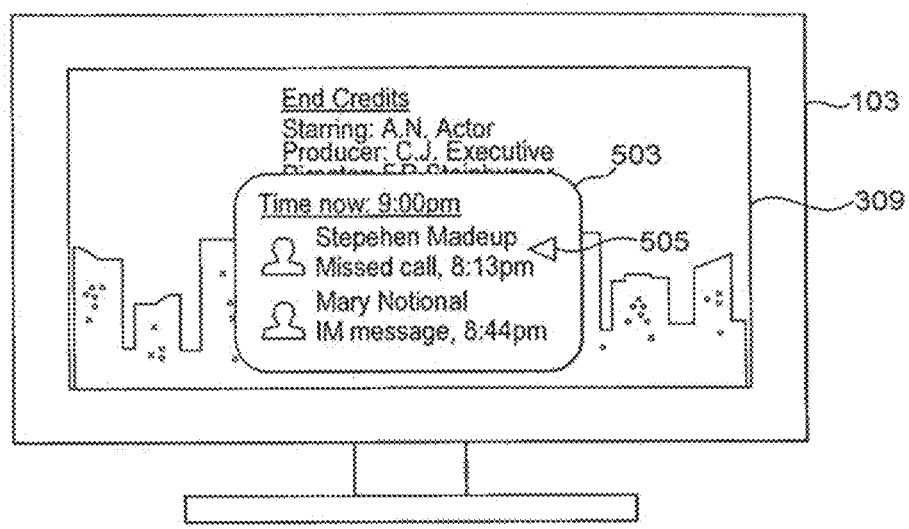
FIG. 5a is a schematic representation of a deferred call notification.

An example is shown in FIG. 5a. Here, the client 113 determines via the API to the EPG that the television programme currently being viewed is scheduled to run from 8:00 pm to 9:00 pm. If an incoming call is signalled over the Internet 101 and received at the network interface 302 during the program, e.g. say at 8:13 pm, then the client application 113 will temporarily block the notification of the incoming call until the scheduled finishing time at 9:00 pm. A similar process would occur if an incoming IM chat message is received during the programme. Following the scheduled end time of the programme (either at that time or just after), the client application 113 will then take control of the screen 309 in order to display a list 503 of any one or more communication events missed during the programme. The list 503 preferably comprises a control such as a cursor 505 which can be controlled by the user, e.g. via function buttons 208 on the remote control, to thereby operate the client 113 initiate a return VoIP call or other corresponding packet-based communication with the respective other user.

In another variant of the first mechanism, the programme timing information 603 may comprise a real-time indication of the programme's actual end time (which can be accessed by the client via the API to the television application in a similar manner as discussed above).

Figure 5B:
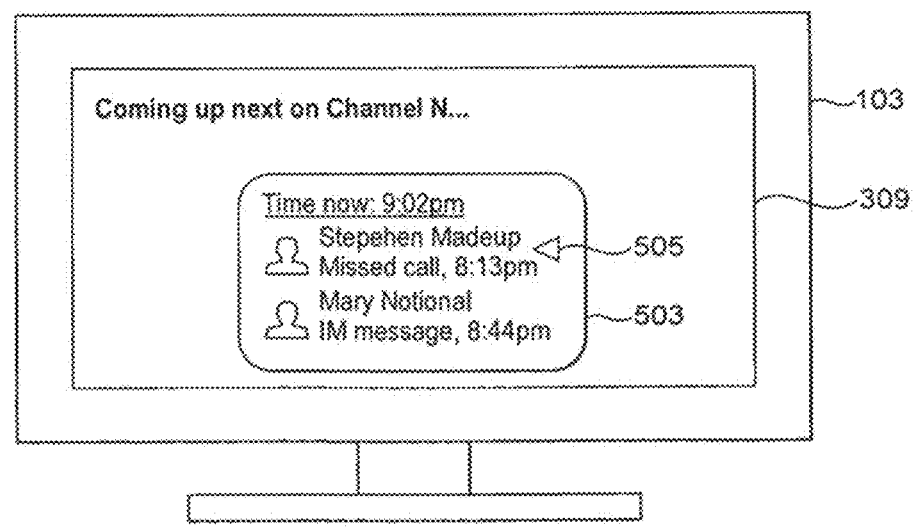
FIG. 5b is a schematic representation of another deferred call notification.

As shown in FIG. 5b, if the programme overruns until a later time than scheduled, e.g. say 9:02 pm, then the client 113 will not display the list 503 of missed events until the actual end time of 9:02 pm. This advantageously avoids the deferred notifications interfering with the last few minutes of a programme (which could even be the most critical part of the programme in the case of a suspense drama for instance). The client 113 will also defer any incoming communications received during the overrunning period (e.g. at 9:01 pm).

Figure 5C:
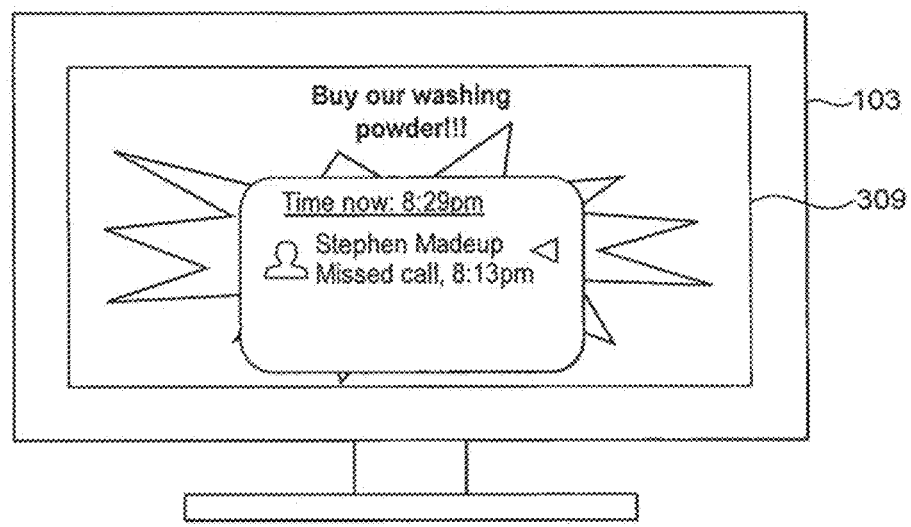
FIG. 5c is a schematic representation of another deferred call notification, and FIG. 6 schematically illustrates transmission of a transport stream.

Further, as shown in FIG. 5c, the real-time programme timing information may also indicate the time of breaks in the programme (typically used as commercial breaks to show advertisements, but potentially also used for other purposes such as news bulletins). In this case the client application 113 will be enabled to display the list of missed events 503 during the break.

A second mechanism for delineating the programme is for the client application 113 to download programme timing information via the Internet 101 and network interface 302, e.g. from a server of a broadcaster, programme production company or third-party service. This downloaded information could comprise either schedule information and/or real-time updates to the scheduled times. This second mechanism has the advantages of the first mechanism, with the added advantage of being compatible with legacy technologies in which certain timing information 603 may not be available via the broadcast (most digital television broadcasts nowadays do at least include schedule information such as the EPG, but do not all necessarily provide real-time indications of programme timing, and furthermore analogue broadcasts do not include any programme timing information). This could even be used in conjunction with the former variant of the first mechanism in order to provide updates to the schedule information received in the broadcast 603.

A third, less preferred mechanism for delineating the programme is to provide a timer that can be set by the user. The timer may be a feature of the client application 113, or be a feature of the television application 330 which may be accessed via the APIs. In this arrangement, the user sets the timer for a predetermined time, and the client application 113 waits until that time before displaying the list of missed events 503. This would have a similar effect as shown in FIG. 5a. As with the former variant of the first mechanism, the third mechanism has the downside of possible interference with the end of an overrunning program, and also has the added downside of requiring an inconvenient user input process. On the other hand this third mechanism has the advantage of being compatible with legacy technologies such as analogue broadcasts which do not include programme timing information, and without requiring additional server infrastructure to provide such information via the internet 101.

A fourth mechanism would be to provide a user-defined "do not disturb" (DND) setting which the client could assert at the beginning of the programme. This could be an existing DND presence status available within the client application 113. In this case the client application 113 is configured to detect when the user de-asserts the DND status, and upon detecting this to automatically display the list of missed events 503.

In some of the above mechanisms it may be necessary for the client application 113 to monitor the current time. This could be done based on a local clock 340, or by receiving updates of the current time from the Internet 101 or television network 108. However, using the latter variant of the first mechanism, there may be no need to monitor the current time if the programme timing information 603 provides a real-time trigger (as opposed to a real-time update of the end time in hours and minutes of the day). There will also be no need to monitor the current time in the fourth, DND-based mechanism.

In a particularly advantageous addition to the present invention, the client application 113 may be further configured to return automated messages to the callers of the missed calls (or more generally to the other users who are the originators of the missed communication events). The automated message is returned by the client application 113 when an incoming communication event is received during an ongoing programme, without requiring an input from the local user viewing the programme (the callee). It is transmitted to the other, remote user (the caller) via the network interface 302 and Internet 101, and informs the caller that the callee is unavailable. Preferably the automated message indicates to the caller the reason why the callee is unavailable (watching TV). In one particularly preferred embodiment, the client application 113 may be configured to use the programme schedule or other timing information to predict when the callee is likely to become available again (i.e. when the current programme is due to finish), and may include this predicted information in the automated message for the benefit of the caller. This could even be incorporated as a new kind of presence status.

It will be appreciated that the above embodiments have been described only by way of example.

For instance, the invention is not limited to on-screen notifications. In other embodiments the notifications may comprise audible notifications output via a speaker 316 or 202, and it may be desirable to defer the audible notifications so that they do not disrupt the user's experience of a current television programme.

Further, the invention is not limited to any particular mechanism for delineating a television program or other viewing activity. A number of examples have been described above, and others may become apparent to a person skilled in the art given the disclosure herein. For example notifications could be deferred until the user changes channel, changes to a different source such as from television programmes to AV input 308, or accesses the EPG. In another example the client could access the decoded audio via an API to the television application 330 and attempt to determine when a commercial break occurs based on a change in peak or average volume levels (broadcasters tend to increase the volume during commercial breaks to get the user's attention, though this method would be vulnerable to false alarms e.g. during action sequences of a programme).

Note also that the term "programme" does not limit to any particular kind of programme content, and could refer for example to a film, soap opera, documentary, sporting event, news program, etc.

Further, other ways of allocating the various client, television and other functionality amongst different processors are envisaged. For example, one or more dedicated signal processors (DSPs) could be arranged to execute the television signal processing engine of the television application 330 and/or the video engine and/or voice engine of the client application 113; with one or more separate CPUs being arranged to execute the UI layer, client engine, protocol and graphics engines of the client application 113 and/or the UI layer and protocol and graphics engines of the television application 330. In another example, the client application and television application could each be run on a different respective CPU embedded in the television set 103. Some or all of the functionality of the television application 330 could alternatively be implemented in dedicated hardware, including the possibility of hardwired signal processing apparatus in the television receiver front-end 304.

Figure 3B:
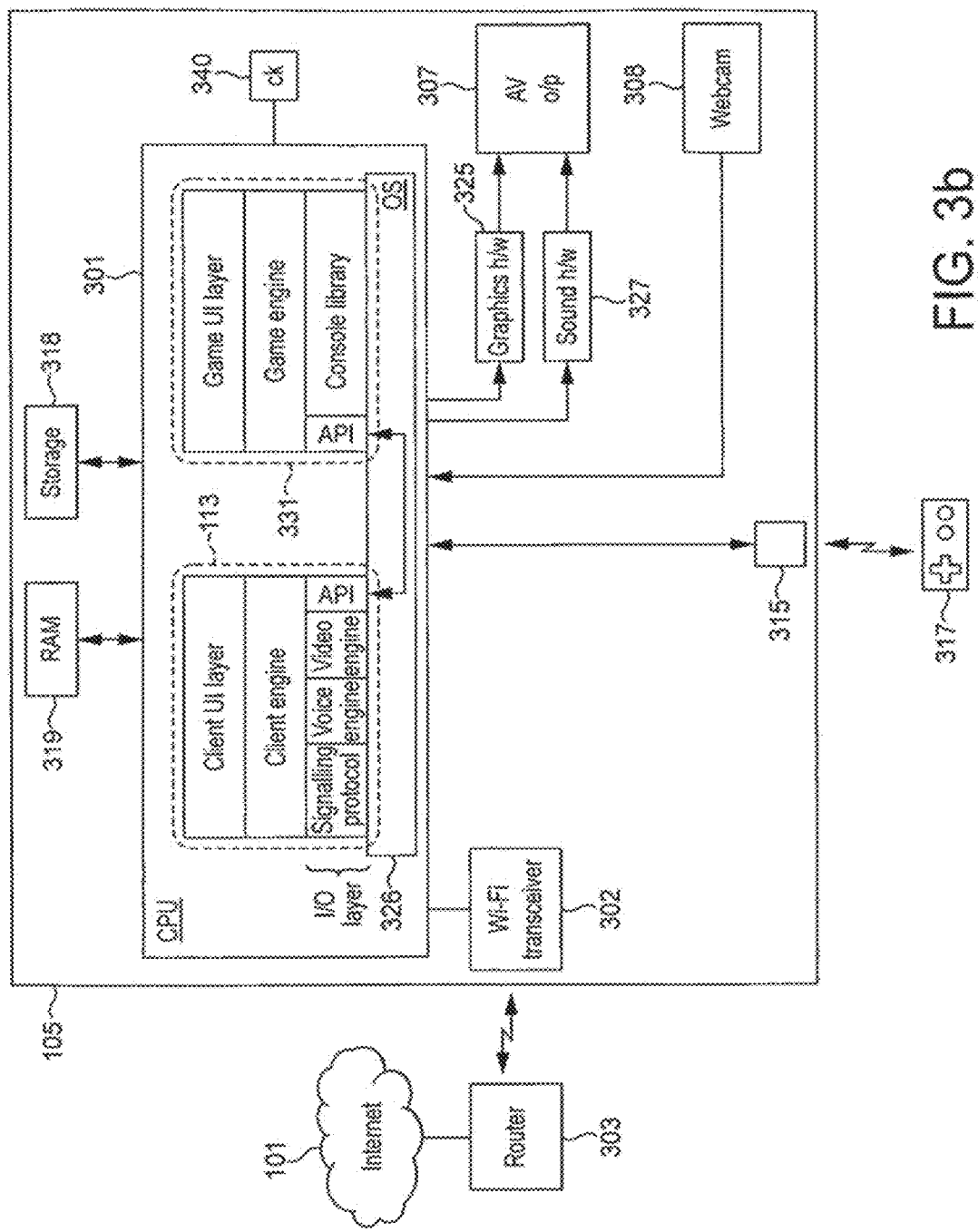
FIG. 3b is a schematic block diagram of a games console.

Furthermore, although the preferred application, the invention is not limited to use in a television set having the above components including television screen all within one single self-contained casing. In another application, the invention could be implemented in a set-top box for plugging into such a television set. In that case the diagram would be similar to that of FIG. 3a but with the television hardware 320, 322, 324 and screen 309 replaced by an audio-video (AV) output. In another application illustrated in FIG. 3b, the client application 113 may be installed on a games console 105. Similarly to the television 103, the console 105 comprises a processing apparatus 301 in the form of one or more CPUs, coupled to: a non-volatile storage means 318 such as hard drive, flash memory and/or optical disc drive; a RAM 319; a webcam or input 308 from a webcam; and a network interface 302 such as a wi-fi transceiver for accessing a packet-based network such as the Internet 101 (e.g. via wireless router 303). The processing apparatus 301 is further coupled to dedicated gaming graphics hardware 325 and dedicated audio hardware 327, which in turn connect to an audio-video (AV) output 307 for connecting the console 105 to a television set 103. The processing apparatus 301 is further coupled to an additional wireless interface 315 operating on a band suitable for communicating to and from a wireless gamepad 317 or other such game controller (or alternatively a wired interface could be provided). The non-volatile storage 318 supplies the client application 113 and a video game 331 (not necessarily from the same storage unit or medium), both arranged for execution on the processing apparatus 301 (preferably under control of an operating system 326). The video game comprises a console library arranged to handle the I/O with the various devices 315, 325, 327 and 308; a game engine arranged to perform the underlying game logic, and a game UI layer arranged to generate game graphics and sound for output via the console library and graphics and sound hardware 325,327.

The video game 331 also comprises an API for communicating with the API of the client application 113 via the OS 326. The APIs may be used to signal occurrences within the video game 331 to the client 113, and these signalled occurrences may be used by the client 113 to delineate the video game for the purpose of deferring notifications. For example, notifications of an incoming call could be deferred until a player dies or loses within the video game. This may be a more suitable juncture to notify the user than mid-game when he or she may not wish to be distracted.

Generally speaking the present invention can be applied to any media appliance having video apparatus for outputting signals to a television screen. The video apparatus may comprise any combination of dedicated hardware and/or regions of memory storing software modules, with any software modules being executed on either the same or a different processor unit as the client application 103. Depending on the appliance and the implementation, the video apparatus may take different forms. In the example television set of FIG. 3a for example, the video apparatus may be said to comprise a combination of the frame buffers 320 and 322, video hardware 324, and/or a region of the non-volatile memory 318 storing signal processing code of the television application. In the example console 105 of FIG. 3b, the video apparatus may be said to comprise the video hardware 325, external AV output 307, and/or a region of the non-volatile storage 318 storing graphics processing code of the video game 331.

Further, the present invention need not be limited by television broadcasts. With increasing popularity of packet-based television services, there may be interest in the idea of a dedicated television set or set-top box with the capability of receiving packet-based television signals, either over the Internet or a dedicated packet-based service.

Furthermore, note that the present invention is not limited particularly to VoIP or to a peer-to-peer topology. Other packet-based networks, protocols and methods of call set-up may also be used.

Other variations of the present invention may be apparent to a person skilled in the art given the disclosure herein. The scope of the present invention is not limited by the described embodiments, but only by the appendant claims.

The invention claimed is:

1. A method of operating a video game console, the method comprising:
   receiving an input from a control device allowing a user to control output of signals from the video game console to a screen during a video game; and
   executing a communication client application on the video game console to allow the user to conduct bidirectional communications with other users via a packet-based network, and output notifications to the user of incoming communication events received from the other users over the packet-based network, wherein the execution of the communication client application further comprises:
      deferring one or more of said notifications of incoming communication events received during video game activity of the video game based on a user-setting;
      receiving a signal indicating an occurrence within the video game;
      determining a delineation in the video game activity based on the received signal indicating the occurrence within the video game; and
      in response to determining the delineation in the video game activity, automatically outputting the deferred one or more notifications to the user following said delineation.

2. The method of claim 1, wherein the delineation comprises a player dying or losing within the video game.

3. The method of claim 1, wherein the incoming communication events comprise text, voice, or live video communication between users.

4. The method of claim 1, wherein the delineation is determined based on an API signaling occurrences within the video game.

5. The method of claim 1, wherein the communication client application is configured to output the deferred notifications for display on the screen along with an on-screen control allowing the user to initiate a return communication with a corresponding other user via the packet-based network.

6. The method of claim 1, wherein the communication client application is configured to return, prior to said delineation, an automated message to the one or more other users of the one or more incoming communication events received during the video game activity.

7. The method of claim 6, wherein the automated message comprises a prediction of the user's expected availability.

8. The method of claim 6, wherein the automated message comprises information about the video game.

9. The method of claim 1, wherein the user-setting is arranged to toggle between a first mode of operation in which notifications of incoming communication events received during the video game activity are deferred, and a second mode of operation in which such notifications are not deferred and are instead output to the user during the video game activity.

10. The method of claim 1, wherein the control device is further configured to receive audio from the user and to communicate audio received from the user to the video game console.

11. A system for operating a video game console, the system comprising:
   a control device configured to allow a user to control output of signals from the video game console to a screen during a video game; and
   control circuitry configured to:
      receive an input from the control device; and
      execute a communication client application on the video game console to allow the user to conduct bidirectional communications with other users via a packet-based network, and output notifications to the user of incoming communication events received from the other users over the packet-based network, wherein the execution of the communication client application further comprises:
         deferring one or more of said notifications of incoming communication events received during video game activity of the video game based on a user-setting;
         receiving a signal indicating an occurrence within the video game;
         determining a delineation in the video game activity based on the received signal indicating the occurrence within the video game; and
         in response to determining the delineation in the video game activity, automatically outputting the deferred one or more notifications to the user following said delineation.

12. The system of claim 11, wherein the delineation comprises a player dying or losing within the video game.

13. The system of claim 11, wherein the incoming communication events comprise text, voice, or live video communication between users.

14. The system of claim 11, wherein the delineation is determined based on an API signaling occurrences within the video game.

15. The system of claim 11, wherein the control circuitry is further configured to defer notifications for display on the screen along with an on-screen control allowing the user to initiate a return communication with a corresponding other user via the packet-based network.

16. The system of claim 11, wherein the control circuitry is further configured to return, prior to said delineation, an automated message to the one or more other users of the one or more incoming communication events received during the video game activity.

17. The system of claim 16, wherein the automated message comprises a prediction of the user's expected availability.

18. The system of claim 16, wherein the automated message comprises information about the video game.

19. The system of claim 11, wherein the user-setting is arranged to toggle between a first mode of operation in which notifications of incoming communication events received during the video game activity are deferred, and a second mode of operation in which such notifications are not deferred and are instead output to the user during the video game activity.

20. The system of claim 11, wherein the control device is further configured to receive audio from the user and to communicate audio received from the user to the video game console.

* * * * *